Patented Dec. 4, 1934

1,982,760

UNITED STATES PATENT OFFICE 1,982,760

SOLVENT FOR PREPARING CELLULOSE ETHER LACQUERS

Leo Rosenthal, Vohwinkel, near Elberfeld, and Otto Leuchs, Elberfeld, Germany, assignors to I. G. Farbenindustrie Aktiengesellschaft, Frankfort-on-the-Main, Germany, a corporation of Germany No Drawing. Application February 10, 1930, Serial No. 427,423

12 Claims. (Cl. 134—79)

The present invention relates to solvents for preparing cellulose ether lacquers and to the new cellulose ether lacquers produced by the aid of such solvents.

It is known to prepare cellulose lacquers from cellulose ethers by dissolving the same in solvents or mixtures of solvents, but the solvents or mixtures thereof heretofore used yield highly viscous solutions which are not suitable as dipping-, brushing- or spraying-lacquers, and therefore when used as dipping-lacquers yield uneven coatings; when used as brushing lacquers, the lacquer does not sufficiently blend, or when used as spraying lacquers, coatings are obtained having no completely smooth surface free from scars.

According to our invention these disadvantages are overcome by using in the manufacture of cellulose ether lacquers a mixture of different solvents consisting of at least 4 components being liquid at about 25° C., at least two of them being aromatic hydrocarbons of different evaporation velocities and at least two of them being aliphatic or hydroaromatic volatile alcohols. In the specification and the claims the term "aliphatic alcohols" is to include the hydroaromatic alcohols.

Suitable aromatic hydrocarbons are, for example, benzene, toluene, xylene, solvent naphtha, mesithylene, cumene, cymene, while as aliphatic alcohols there may be mentioned by way of example, methanol, ethanol, propanol, butanol, amyl alcohol, glycol-mono-methylether, glycol - mono - ethylether, glycol - mono-propyl-ether, glycol - mono - butylether, hydrogenated phenols, such as cyclohexanol, methylcyclohexanol.

In carrying out the invention it has been found favorable to choose the components of these mixtures in such a manner that an always continuous evaporation of the mixture of the solvents takes place.

Such mixtures may consist for instance of:

(1) Benzene+toluene+ethanol+isopropyl alcohol.
(2) Toluene+solventnaphtha+ethanol+isopropyl alcohol+amyl alcohol.
(3) Benzene+toluene+xylene + solventnaphtha +methanol + mono - ethyl-glycol-ether + mono-butyl-glycol-ether.
(4) Xylene+solventnaphtha+methanol+monoethyl-isopropyl glycol ether+cyclohexanol.
(5) Toluene+xylene+n-propyl alcohol+isobutyl alcohol.

The relative proportions of the four components may be varied within the widest limits and are advantageously adapted to the specific lacquering art for which the final mixture is to be used, as will be understood by persons skilled therein. Thus, for preparing brushing lacquers there is used a mixture which evaporates very slowly, such as the mixture No. 4; in order to prepare spraying lacquers, a solvent having a middle evaporation velocity is advantageously used, for example, mixtures 2 or 5, and for preparing dipping lacquers such solvent is used as has the evaporation velocity of the mixture No. 1. The quantities of the different components are further to be adapted to the specific cellulose ether used. The cellulose ethers coming into consideration for the purpose of the invention, being insoluble in water, but soluble in organic solvents, are such as alkyl-, aralkyl- or alkylaralkyl-cellulose, for example, ethyl cellulose with an ethoxyl content of at least 40%, ethylbutyl cellulose, benzyl-cellulose with a content of at least 40% of benzyl, and ethyl-benzyl-cellulose. In preparing a lacquer from ethyl cellulose with an ethoxyl-content of 42–44%, a mixture of solvents consisting of 40–80% of aromatic hydrocarbons and 60–20% of aliphatic or hydroaromatic alcohols has been found suitable. A cellulose ethyl ether containing 47–48% of ethoxyl can be dissolved in a mixture consisting of 70–95% of aromatic hydrocarbons and 5–30% of the said alcohol, while benzyl cellulose containing 55% of benzyl may advantageously be dissolved in a mixture of 80–97% of aromatic hydrocarbons and 3–20% of alcohol.

For certain purposes other substances which impart additional qualities to the lacquers may be added, for example, softening agents, such as alkyl- or aralkyl-phosphates, phthalic acid ester, derivatives of the benzene- or toluene- sulfonic acid, such as p-toluene-sulfonic acid-diethylamide, or resins, for example, resin, glycerineabietinate, cumarone-resin, dammar or other natural or artificial resins, copals or drying oils may be added to the lacquers. Waxes may be jointly used in order to obtain lacquers of mat surfaces.

The invention is illustrated by the following examples, but is not limited thereto:

*Example 1.*—A dipping lacquer consists of a solution of:

| | Parts by weight |
|---|---|
| Ethyl-cellulose (with 48% of ethoxyl) | 5 |
| Benzene | 50 |
| Toluene | 30 |
| Xylene | 5 |
| Ethanol | 5 |
| Isopropyl alcohol | 5 |

The coatings prepared with this dipping lacquer possess a very smooth, lustrous surface showing no stripes.

In case the surface is intended to be smoother, 1-4 parts by weight of tricresylphosphate may be added to the above mentioned lacquer; and if a harder surface is desired, 1-3 parts by weight of a cumarone-resin of high melting point are added to the above lacquer.

*Example 2.*—A brushing-lacquer consists of:

| | Parts by weight |
|---|---|
| Ethyl-butylcellulose of low viscosity with 27% ethoxyl+22% butoxyl | 12 |
| Phthalic acid dibutylester | 2 |
| Glycerine-abietinate | 1 |
| Xylene | 25 |
| Solventnaphtha | 35 |
| Ethanol | 10 |
| Mono-isopropyl-glycol | 25 |
| Cyclohexanol | 5 |

*Example 3.*—A spraying-lacquer consists of:

| | Parts by weight |
|---|---|
| Ethylcellulose (42.5% ethoxyl) | 8-10 |
| Toluene | 30 |
| Solventnaphtha | 15 |
| Ethanol | 25 |
| Amyl alcohol | 20 |

To increase the luster of this lacquer, 2 parts by weight of dammar, 1 part by weight of triphenylphosphate and 1 part by weight of tricresylphosphate may be added to the same.

*Example 4.*—A lacquer consists of:

| | Parts by weight |
|---|---|
| Benzyl cellulose (54% benzyl) | 8 |
| Tricresylphosphate | 5 |
| High-melting cumarone resin | 5 |
| Toluene | 30 |
| Xylene | 60 |
| N-propyl alcohol | 5 |
| Isobutyl alcohol (or butyl glycol) | 5 |

This lacquer is intimately mixed with 10-15 parts by weight of red iron oxide to coat, for example, metals.

*Example 5.*—A cellulose ether lacquer miscible with nitrocellulose lacquers is obtained by dissolving:

| | Parts by weight |
|---|---|
| Ethyl cellulose (47% ethoxyl) | 10 |
| Benzene | 20 |
| Toluene | 20 |
| Butanol | 5 |
| Mono-ethyl-glycol | 5 |
| Ethyl acetate or acetone | 10-15 |
| Butyl acetate | 10-15 |
| Cyclohexyl acetate | 10-20 |

*Example 6.*—A lacquer consisting of:

| | Parts by weight |
|---|---|
| Ethyl cellulose (of an ethoxyl-content of 42.5%) | 10 |
| Tricresylphosphate | 5 |
| Toluene | 20 |
| Xylene | 25 |
| Butanol | 20 |

35 parts by weight of glycol-mono-ethyl ether is mixed with:
10 parts by weight of alcohol and
20 parts by weight of ethyl-glycol-acetate.

If required, this lacquer may be mixed with nitro-cellulose lacquers.

*Example 7.*—A brushing-lacquer which may be employed for giving the first coat to wood consists of:

| | Parts by weight |
|---|---|
| Ethylcellulose (48.2% ethoxyl) | 8 |
| Linseed oil | 8 |
| Cumarone resin | 2 |
| Toluene | 10 |
| Xylene | 40 |
| Solvent-naphtha | 32 |
| Ethanol | 5 |
| Amyl alcohol | 5 |

To this lacquer there may be added 10 parts by weight of n-butyl acetate or cyclohexanone.

*Example 8.*—A lacquer containing benzine is prepared by dissolving
10 parts by weight of ethylcellulose (47% ethoxyl) in a mixture of

| | Parts by weight |
|---|---|
| Benzene | 25 |
| Toluene | 10 |
| Xylene | 10 |
| Ethanol | 5.5 |
| Butanol | 5.5 |
| Benzine (boiling point 80-100° C.) | 45 |

*Example 9.*—A brushing-lacquer consists of:

| | Parts by weight |
|---|---|
| Ethylbenzyl cellulose | 10 |
| Xylene | 20 |
| Toluene | 20 |
| Solventnaphtha | 20 |
| Ethanol | 10 |
| Isopropyl alcohol | 10 |
| Butanol | 10 |
| Mono-butyl-glycol | 10 |

To this lacquer there may be added softening agents or resins.

We claim:

1. Process of making cellulose ether lacquers which consists in mixing more than one volatile aromatic hydrocarbon having different evaporation velocities and more than one volatile aliphatic alcohol, all of said components being liquid at about 25° C., and dissolving a cellulose ether in the mixture.

2. A lacquer comprising a water-insoluble cellulose ether of the group consisting of alkyl-, aralkyl- and alkyl-aralkyl-cellulose dissolved in a solvent consisting of more than one volatile aromatic hydrocarbon having different evaporation velocities and more than one volatile aliphatic alcohol, the hydrocarbons and alcohols being liquid at about 25° C.

3. A lacquer as defined in claim 2 to which a softening agent has been added.

4. A lacquer as defined in claim 2 to which a softening agent and a resin have been added.

5. A lacquer comprising an ethyl cellulose having an ethoxyl content of at least 40%, dissolved in a solvent consisting of more than one volatile aromatic hydrocarbon having different evaporation velocities and more than one volatile aliphatic alcohol, the hydrocarbons and alcohols being liquid at about 25° C.

6. A lacquer as defined in claim 5 to which a softening agent has been added.

7. A lacquer as defined in claim 5 to which a softening agent and a resin have been added.

8. A lacquer consisting of a cellulose-ethyl-ether with an ethoxyl-content of 42-44% dissolved in a solvent consisting of 40-80% of more than one volatile aromatic hydrocarbon having different evaporation velocities and the remainder up to 100% consisting of more than one volatile aliphatic alcohol, all of the components of the solvent being liquid at about 25° C.

9. A lacquer consisting of an ethyl-cellulose with an ethoxyl-content of 42.5% dissolved in a solvent consisting of toluene, solvent naphtha, ethanol and amyl alcohol.

10. A lacquer consisting of an ethyl-cellulose with an ethoxyl-content of 42.5% dissolved in a solvent consisting of 30 parts by weight of toluene, 15 parts by weight of solvent naphtha, 25 parts by weight of ethanol, and 20 parts by weight of amyl alcohol.

11. A lacquer comprising an ethyl-cellulose containing an ethoxyl content of 47-48% dissolved in a solvent consisting of more than one volatile aromatic hydrocarbon having different evaporation velocities and more than one volatile aliphatic alcohol, the hydrocarbons and alcohols being liquid at about 25° C.

12. A lacquer consisting of an ethyl-cellulose with an ethoxyl content of 47-48% dissolved in 70-95% of more than one volatile aromatic hydrocarbon having different evaporation velocities and 5-30% of more than one volatile aliphatic alcohol, all of the components of the solvent being liquid at about 25° C.

LEO ROSENTHAL.
OTTO LEUCHS.